United States Patent
Anand et al.

(10) Patent No.: US 8,386,609 B2
(45) Date of Patent: Feb. 26, 2013

(54) RECONNECTION TO AND MIGRATION OF ELECTRONIC COLLABORATION SESSIONS

(75) Inventors: Vaijayanthimala K. Anand, Austin, TX (US); Sandra K. Johnson, Cary, NC (US); Linda Jones Scott, Georgetown, TX (US); Kimberly DaShawn Simon, Pflugerville, TX (US); Terry G. Thomas, Jr., Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 11/937,981

(22) Filed: Nov. 9, 2007

(65) Prior Publication Data

US 2009/0125589 A1    May 14, 2009

(51) Int. Cl.
*G06F 15/173* (2006.01)
*G06F 15/16* (2006.01)
*G06F 9/46* (2006.01)

(52) U.S. Cl. ......... 709/226; 709/224; 709/229; 718/105
(58) Field of Classification Search .......... 709/223–224, 709/226, 201–207, 228
See application file for complete search history.

(56) References Cited

U.S. PATENT DOCUMENTS

| | | | |
|---|---|---|---|
| 5,214,637 A | 5/1993 | Sridhar et al. | |
| 5,440,624 A | 8/1995 | Schoof, II | |
| 5,692,213 A | 11/1997 | Goldberg et al. | |
| 6,876,734 B1 | 4/2005 | Summers et al. | |
| 7,003,286 B2 | 2/2006 | Brown et al. | |
| 7,069,298 B2 * | 6/2006 | Zhu et al. | 709/204 |
| 7,085,558 B2 | 8/2006 | Berstis et al. | |
| 7,092,370 B2 | 8/2006 | Jiang et al. | |
| 7,096,271 B1 | 8/2006 | Omoigui et al. | |
| 7,130,883 B2 | 10/2006 | Zhu et al. | |
| 7,133,831 B2 | 11/2006 | Brown et al. | |
| 2002/0120760 A1 * | 8/2002 | Kimchi et al. | 709/230 |
| 2003/0097410 A1 | 5/2003 | Atkins et al. | |
| 2003/0167418 A1 | 9/2003 | Zhu et al. | |
| 2004/0203677 A1 * | 10/2004 | Brown et al. | 455/416 |
| 2005/0004982 A1 | 1/2005 | Vernon et al. | |
| 2005/0037787 A1 | 2/2005 | Bachner, III et al. | |
| 2006/0053194 A1 | 3/2006 | Schneider et al. | |
| 2006/0053195 A1 | 3/2006 | Schneider et al. | |
| 2006/0053196 A1 | 3/2006 | Spataro et al. | |

(Continued)

OTHER PUBLICATIONS

Shim, David, "Third Party Ad Serving—What Is It," http://eccobay.wordpress.com/2006/05/19/third-party-ad-serving-what-is-it/, May 2006.*

*Primary Examiner* — Ashok Patel
*Assistant Examiner* — Evans Desrosiers
(74) *Attorney, Agent, or Firm* — John Pivnichny; Roberts Mlotkowski Safran & Cole, P.C.

(57) ABSTRACT

The invention generally relates to electronic collaboration sessions and, more particularly, to systems and methods for providing reconnection to and migration of electronic collaboration sessions. A method for managing a collaboration session includes providing a computer infrastructure structured and arranged to store data regarding a plurality of clients of a collaboration session, and monitor a connection of each of the plurality of clients to a host system. The computer infrastructure is further operable to (i) migrate the plurality of clients to a new host system after determining that a number of the plurality of clients experiencing connection problems with the first host system exceeds a threshold value and/or (ii) present customized summary data to at least one of the plurality of clients after the at least one of the plurality of clients reconnects to the collaboration session after having been disconnected from the collaboration session.

23 Claims, 8 Drawing Sheets

U.S. PATENT DOCUMENTS

| | | |
|---|---|---|
| 2006/0053380 A1 | 3/2006 | Spataro et al. |
| 2006/0062368 A1 | 3/2006 | Saha et al. |
| 2006/0070003 A1 | 3/2006 | Thompson et al. |
| 2006/0080432 A1 | 4/2006 | Spataro et al. |
| 2007/0074076 A1* | 3/2007 | Imai et al. ................ 714/26 |
| 2007/0232284 A1* | 10/2007 | Mason et al. ............. 455/416 |
| 2008/0137756 A1* | 6/2008 | Scherlis et al. ......... 375/240.28 |

* cited by examiner

EXEMPLARY COLLABORATION SESSION DATA STRUCTURE collaboration_session_struct { primary_collaboration_type: ctype; /* net_meeting, web_conf., VOIP, etc. */
secondary_collaboration_type[HEAD..TAIL]: ctype;

connection_struct {
connection_type; /* type of connection, network specifics */
connection_status; /* good, aborted, problematic */
connection_wait_time: time_type; /* time to wait for connection to be established */
} connection;
collaboration_connection_type: connection;

^member_list[HEAD..TAIL];
member_struct {
member_name: text;
member_service_type; /* web, voice, shared resource, etc. */
member_contact_info: text; /* specifies how to contact participant for collaboration */
member_connection_status; /* good, aborted, problematic */
member_connection_type: connection;
} member_list;

^resource_list[HEAD..TAIL];
resource_struct {
resource_name: text;
resouce_type: rtype; /* MS PowerPoint, MS Word, audio, video, etc.*/
} resource_list;

} collaboration_session;

Figure 3

EXEMPLARY PARTICIPANT DATA STRUCTURE

```
^member_list[HEAD..TAIL];
member_struct {
member_name: text;
member_service_type; /* web, voice, shared resource, etc. */
member_contact_info: text; /* specifies how to contact participant for collaboration */
member_connection_status; /* good, aborted voluntarily, aborted involuntarily, problematic, etc. */
member_connection_type: connection;
member_drop_location; /* place in collaboration session when member dropped */
member_drop_tinestamp: timestamp; /* time connection was dropped */
} member_list;
```

Figure 4

RECONNECTION TO AND MIGRATION OF ELECTRONIC COLLABORATION SESSIONS

FIELD OF THE INVENTION

The invention generally relates to electronic collaboration sessions and, more particularly, to systems and methods for providing reconnection to and migration of electronic collaboration sessions.

BACKGROUND OF THE INVENTION

Current networking and computing technology facilitates the electronic collaboration of multiple individuals who may be globally dispersed (i.e., located at different geographic locations). Examples of such electronic collaboration sessions include web conferences, Internet conference calls, net meetings, etc. Such electronic collaboration sessions allow geographically dispersed people to meet and interact in real time using various computing devices. This can lead to improved communication and efficiency in virtually any setting.

However, there are several common occurrences that reduce the optimization of effective communication and collaboration when utilizing these electronic collaboration sessions. One such occurrence is a dropped network connection to the electronic collaboration session by one, many, or all of the users. When a user's network connection is dropped, the communication between that user and the remaining users of the electronic collaboration session is stopped.

In the case of an individual user whose network connection is dropped, the user typically attempts to manually re-connect to the electronic collaboration session as soon as possible. If the user is able to re-connect, the user is faced with the problem of having missed information that was discussed while the user was disconnected. In such cases, the user may interrupt the others and ask what information was missed; however, this is bothersome to and inefficient for the other users who were not disconnected.

Another option for a re-connected user is to attempt to make sense of what was missed by quickly reviewing any available shared resources of the electronic collaboration session. In this case, however, the re-connected user's attention is diverted from the real time happenings of the electronic collaboration session while the user tries to "catch up" to the others. A third option for the reconnected user is to just ignore what material was missed. This, however, presents a clear disadvantage of missing potentially important information.

Other connectivity problems associated with electronic collaboration sessions affect multiple users, instead of the situation of an individual dropped user described above. For example, the host of the electronic collaboration session may experience a network connectivity problem, in which all users are dropped from the event. Also, there may be more users attempting to join the event than the host system has resources for, in which case multiple users cannot participate in the electronic collaboration session. Such problems are frustrating for all those involved, and can quickly diminish the effectiveness of an electronic collaboration session.

Accordingly, there exists a need in the art to overcome the deficiencies and limitations described hereinabove.

SUMMARY OF THE INVENTION

In a first aspect of the invention, a method for migrating a collaboration session comprises storing data regarding a plurality of clients of a collaboration session, and monitoring a connection of each of the plurality of clients to a first host system. The method also includes determining when a number of the plurality of clients experiencing connection problems with the first host system exceeds a threshold value, and migrating the plurality of clients to a second host system.

In a second aspect of the invention, a method for managing reconnection of users to a collaboration session comprises storing data associated with a plurality of clients of a collaboration session, and monitoring a connection of each of the plurality of clients to a host system. The method also includes determining a time period between at least one of the plurality of clients disconnecting from and reconnecting to the collaboration session, and presenting customized summary data of the collaboration associated with the time period to the at least one of the plurality of clients, after the at least one of the plurality of clients reconnects to the collaboration session.

In a third aspect of the invention, there is a method for managing a collaboration session. The method includes providing a computer infrastructure structured and arranged to store data regarding a plurality of clients of a collaboration session, and monitor a connection of each of the plurality of clients to a host system. The computer infrastructure is further operable to (i) migrate the plurality of clients to a new host system after determining that a number of the plurality of clients experiencing connection problems with the first host system exceeds a threshold value and/or (ii) present customized summary data to at least one of the plurality of clients after the at least one of the plurality of clients reconnects to the collaboration session after having been disconnected from the collaboration session.

In a fourth aspect of the invention, there is a computer program product comprising a computer usable medium having a computer readable program embodied in the medium. The computer readable program, when executed on a computing device, is operable to cause the computing device to store data regarding a plurality of clients of a collaboration session, and monitor a connection of each of the plurality of clients to a host system. The computer readable program, when executed on a computing device, is further operable to cause the computing device to (i) migrate the plurality of clients to a new host system after determining that a number of the plurality of clients experiencing connection problems with the first host system exceeds a threshold value and/or (ii) present customized summary data to at least one of the plurality of clients after the at least one of the plurality of clients reconnects to the collaboration session after having been disconnected from the collaboration session.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3 and 4 show exemplary data structures according to aspects of the invention.

DETAILED DESCRIPTION OF EMBODIMENTS OF THE INVENTION

The invention generally relates to electronic collaboration sessions, and, more particularly, to systems and methods for providing reconnection to and migration of electronic collaboration sessions. In exemplary implementations of the invention, a user who is disconnected from a collaboration session is provided with a customized recap of the information that was presented while the user was disconnected. In this manner, the user may efficiently and effectively catch-up to the real time collaboration session. In further exemplary implementations of the invention, when a threshold number of users or the host is disconnected, the entire electronic collaboration session may be migrated to another system that can adequately support all of the users and the host. In this manner, the dropped users are automatically re-connected and the non-dropped users are transparently moved to the more stable system.

Figure 1:
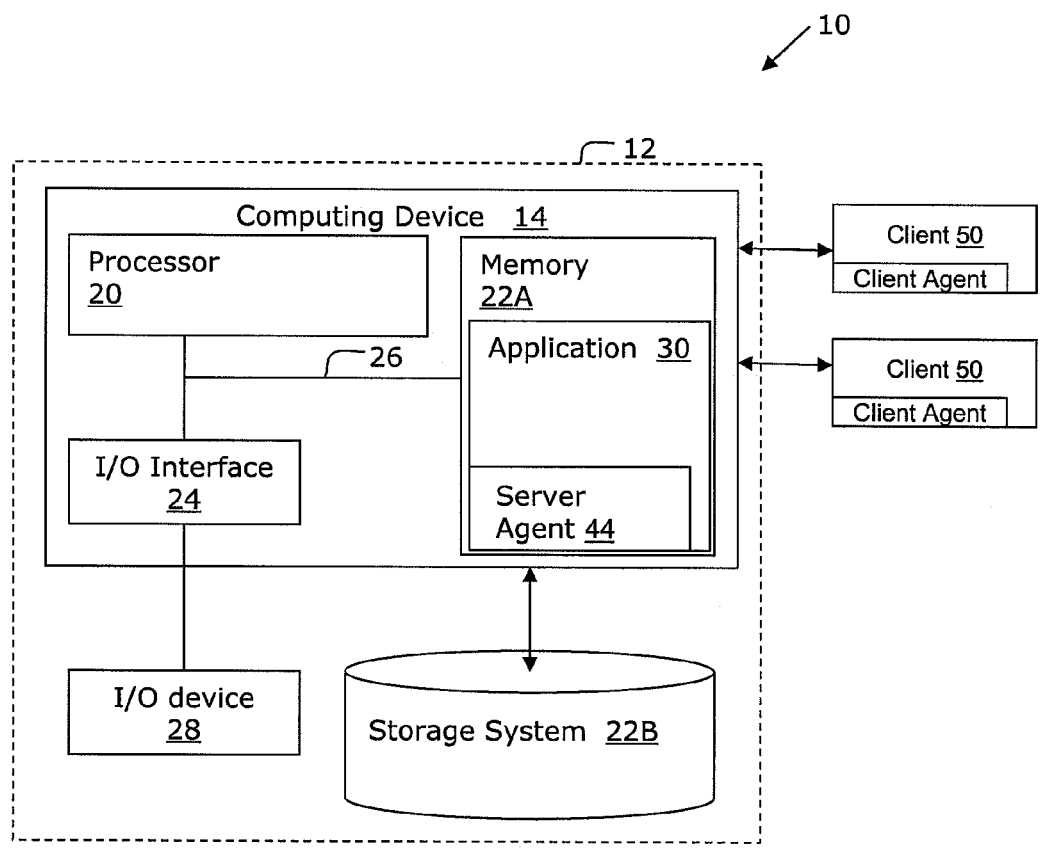
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a server agent 44 (e.g., a software agent), which makes the computing device 14 operable to perform the processes described herein, such as, for example, migrate a collaboration session, provide customized summary data to a reconnecting user of a collaboration session, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., server agent 44) in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code (e.g., server agent 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

In embodiments, the computing device 14 is structured and arranged to be operatively connected to at least one client computing device 50 in a collaboration session environment. For example, the plural client computing devices 50, each comprising a general purpose computing device and a client software agent, may be operable to communicate with the computing device 14 via any suitable type of communications link (e.g., LAN, WAN, the Internet, etc.). In further embodiments, the server agent 44 and client software agent cooperate to monitor a network connection between the computing device 14 and the client computing device 50.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, migrate a collaboration session, provide customized summary data to a reconnecting user of a collaboration session, etc. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Migration of a Collaboration Session

Figure 2:
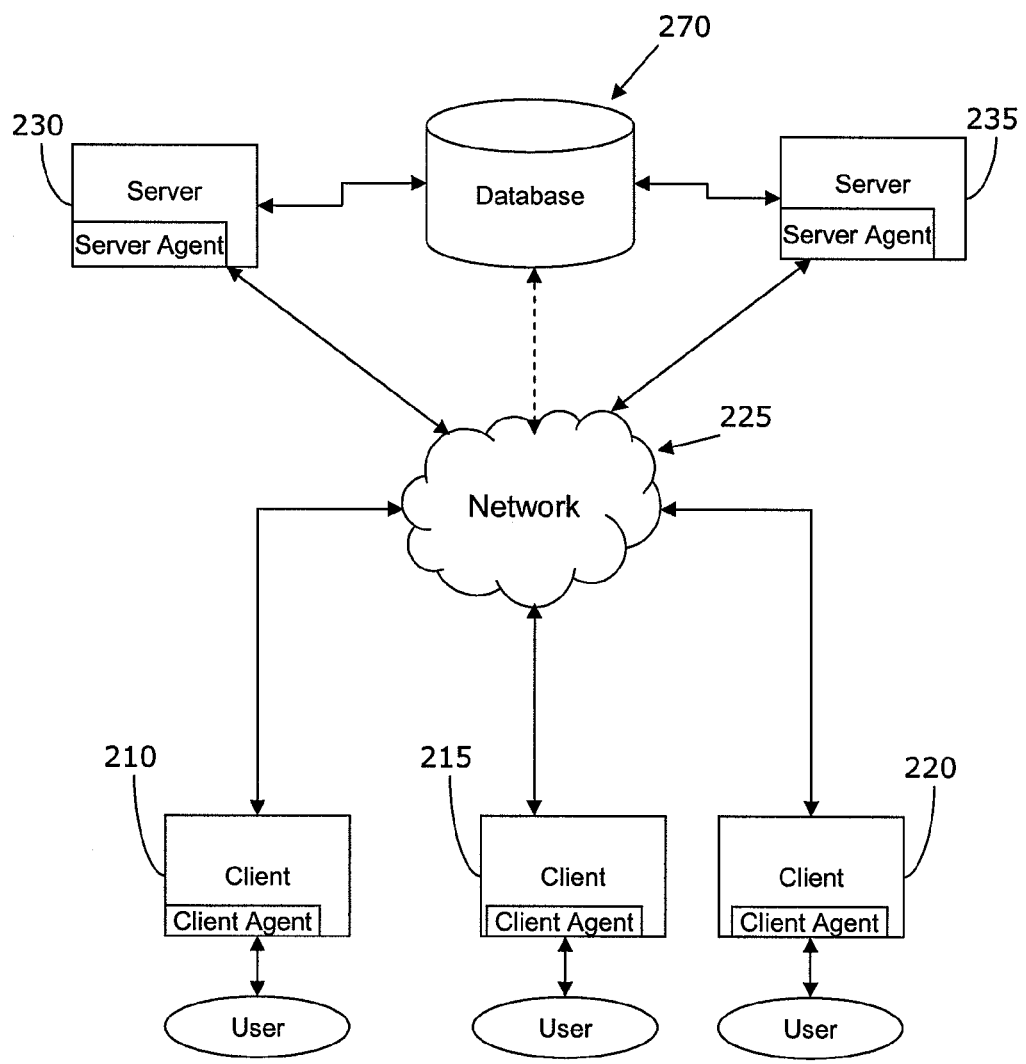
FIG. 2 shows an exemplary system according to aspects of the invention.

FIG. 2 shows an exemplary system according to aspects of the invention. In embodiments, any suitable number of clients 210, 215, 220 are connected to a network 225. Each client 210, 215, 220 may comprise a computing device that is capable of connecting to a collaboration session, such as client computing device 50 described with respect to FIG. 1. The network 225 may be any suitable electronic communication network, such as, for example, a LAN, a WAN, the Internet, etc. Moreover, each client 210, 215, 220 comprises at least one client software agent for participating in the desired electronic collaboration session and for performing aspects of the processes described herein. Although three clients are shown, the invention is not limited to this number, and any suitable number of clients (each located at any geographical location) may be used.

Still referring to FIG. 2, at least one server 230 is also connected to the network 225. In the exemplary embodiment shown, two servers 230, 235 are connected to the network 225. However, the invention is not limited to the number of servers shown, and any suitable number of servers may be used with the invention. The servers 230, 235 may comprise a computing device, such as that described with respect to FIG. 1. Alternatively, the servers 230, 235 may be logical servers residing on a computing device. Moreover, each server 230, 235 comprises at least one server agent, such as, for example, server agent 44 described with respect to FIG. 1.

The server agent is arranged for hosting the desired electronic collaboration session and for performing aspects of the processes described herein.

Moreover, each server 230, 235 may be further structured and arranged to communicate with a database 270, such as, for example, storage system 22B described with respect to FIG. 1. Each server may communicate with the database 270 in any suitable manner, such as through a direct connection or through the network 225. The database 270 is operable to store data regarding the electronic collaboration session, and, particularly, the clients 210, 215, 220 participating in the electronic collaboration session.

According to a first aspect of the invention, and as described in greater detail with respect to the processes of the invention, collaboration session participants (e.g., users) utilize clients 210, 215, 220 to join a collaboration session by communicating with a server 230 via the network 225. The server agent sets up the collaboration session automatically, as is known such that further explanation is not believed necessary. For example, if the collaboration session is a web conference, the server agent sets up this web conference for all clients by notifying the clients that the collaboration session has been created and is available for use, placing any shared resources to be utilized during the web conference at a data location, and notifying the clients where to go (e.g., a URL) to start the web conference.

As part of a collaboration session instantiation, the server agent collects data regarding each client's identity (e.g., name), each client's primary and secondary collaboration type (e.g., net meeting, web conference, VOIP, etc.), and each client's connection type (network, telephone, etc.). Each client may have such information stored in a profile at the client computing device (or at a central database). Additionally or alternatively, the server agent may prompt each client to provide such information (e.g., via prompts and responses) during initial connection to the collaboration session.

In embodiments, the data collected by the server agent is stored in a collaboration session data structure, such as, for example, that depicted in FIG. 3. The collaboration session data structure also contains data regarding any shared resources that are part of the collaboration session, which is available from the server agent. The collaboration session data structure may be stored at the database 270. The data contained in the collaboration session data structure is used to migrate the collaboration session to another host system (e.g., another server and/or router(s)) if the server agent determines that such a migration is necessary.

For example, in embodiments the server agent utilizes known connection monitoring techniques to monitor the connection of each client as the collaboration session is in progress. As a result, the server agent is able to detect when a client's connection has aborted, is aborting, or is about to abort. Thus, when a threshold number of clients' connections have aborted or are about to abort, the server agent initiates a migration of the collaboration session to another host (e.g., from first server 230 to second server 235). The threshold can be set at any appropriate level by an administrator (e.g., user) of the server agent. For example, the threshold may be set at ten percent (or any other suitable value) by an initial programming of the server agent, or by a user interaction with the server agent. In this manner, when at least ten percent of the clients participating in the collaboration session are experiencing or about to experience connection problems, the server agent will initiate a migration of the collaboration session to a new host system.

In embodiments, migration of the collaboration session is performed by the server agent utilizing the data contained in the collaboration session data structure. For example, referring to FIG. 2, the first server 230 may be hosting a collaboration session between clients 210, 215, 220 when the server agent of first server 230 detects that client 210 is experiencing (or about to experience) a connection problem. The server agent may access a list of potential new host systems, which list may be stored at database 270. From the list, the server agent may determine that second server 235 will act as the new host system of the collaboration session. Accordingly, the server agent transfers the shared resources, as indicated by the resource list of the collaboration session data structure, of the collaboration session to the new host system (e.g., second server 235)

Additionally during migration, the server agent also automatically transfers the non-dropped clients to the new host system (e.g., second server 235). For example, the server agent establishes a connection between the non-dropped client and the new host system, and terminates the connection between the non-dropped client and the old host (e.g., first server 230). This may be performed automatically (e.g., transparently to each client) since the connection type and client identity for each client is obtained from the collaboration session data structure.

Also during migration, the server agent automatically reconnects disconnected clients to the new host system (e.g., second server 235). For example, the server agent attempts to establish a connection between the new host system and each dropped client using each respective client's primary collaboration type. If a client's primary collaboration type is not available, then the server agent attempts to re-establish the collaboration session using the secondary collaboration type. This may be performed automatically (e.g., transparently to each client) since the primary and secondary collaboration type, connection type, and client identity for each client is obtained from the collaboration session data structure.

In further embodiments, the server agent also conducts a causal analysis of why a migration of the collaboration session was necessary, and utilizes the causal analysis to avoid similar problems in the future. For example, the server agent may be arranged to communicate with the various client agents to detect what network issues (e.g., a particular router, server, protocol, etc.) caused at least the threshold number of clients to be dropped. Data associated with the causal analysis may be stored (e.g., in database 270), such that when a future migration is necessary, the server agent will designate a new host system that minimizes use of historically known problematic network issues.

While a single server agent has been described with respect to the examples above, it is noted that the invention is not limited to a single server agent. For example, a master server agent may spawn individual server agents for handling particular aspects of the invention. For example, a master server agent may spawn individual server agents to perform any of the following tasks: set up (e.g., instantiate) the collaboration session; collect data from each client and populate the collaboration session data structure; monitor the connection status of each client during the collaboration session; migrate the collaboration session to a new host system; perform causal analysis. Additionally, when a collaboration session is migrated to a new host system, a new server agent, may be spawned on the new host system. The new server agent assumes the roles and functions of the original server agent on the previous host.

In this manner, implementations of the invention migrate a collaboration session in the event of a failure of service. According to aspects of the invention, when a collaboration session service fails, a client's primary or backup collaboration type is used to re-connect to a migrated collaboration session. As such, the potentially adverse consequences of failure of service of a collaboration session are minimized.

Managing Reconnecting Collaboration Session Participants

According to further aspects of the invention, the system and method provide a customized recap to a user who is reconnecting to a collaboration session after the user was dropped from the collaboration session. In embodiments, a collaboration session is conducted in the environment depicted in FIG. 2, in which at least one host (e.g., server 230) and plural users (e.g., clients 210, 215, 220) communicate via a network 225. Although a single server 230 and three clients 210, 215, 220 are described with respect to this aspect of the invention, it is noted that the invention is not limited to these numbers, and any suitable number of servers and or clients may be used with the invention.

In embodiments, at least one server agent resides on the server 230 and at least one client agent resides on each client 210, 215, 220. These agents may be the same server and client agents described above with respect to migration, or may be separate software components. These agents are arranged to perform aspects of the invention described herein. For example, the server agent may be arranged to communicate with each respective client agent to monitor the connection status of each respective client 210, 215, 220 to the collaboration session. In this way, the server agent can determine when a client is voluntarily or involuntarily dropped from the collaboration session (i.e., disconnected from the server 230).

In further embodiments, the server agent prompts a host (e.g., moderator) of a collaboration session to provide summary data before the collaboration session begins. The summary data may comprise, for example, any combination of summary text, summary slides, summary audio, summary video, etc., that is recorded and saved (e.g., at database 270). Portions of the summary data are associated with respective portions of the collaboration session, such that a user who misses a portion of the collaboration session is able to access a specific portion of summary data to catch up.

In additional embodiments, the server agent is arranged to record the exact times when a user disconnects from and subsequently reconnects to the collaboration session. When the user reconnects, the server agent determines from stored timestamps what portions of the collaboration session were missed, and gathers stored summary data associated with the missed portion(s) of the collaboration session. Additionally or alternatively, the server agent may begin recording the collaboration session when a user is involuntarily dropped, so that the user may view the entire missed portion(s) of the collaboration session upon reconnecting.

Moreover, in embodiments, the server agent is arranged to present options to a reconnected user of what type of summary information is available. For example, the server agent may present the user with options such as: skip any available summary information and join the collaboration session in progress; listen to and/or view summary text, slides, audio, and/or video; listen to and/or view a time-shifted recording of the ongoing collaboration session (e.g., similar to digital video recorder (DVR) technology used with television), etc.

In even further embodiments, the server agent is arranged to inform the host of the collaboration session when a user is dropped from the collaboration session, and whether the drop is voluntary or involuntary. In this way, the host has more control over the flow of the collaboration session. For example, if a critical person or group of people dropped out of the collaboration session, the presenter may choose to delay the collaboration session if those disconnections are due to extraneous reasons (e.g., involuntary).

According to aspects of the invention, the server agent utilizes a participant data structure to facilitate the functions described herein. In embodiments, the participant data structure is similar to that shown in FIG. 4, and may comprise data regarding, but not limited to: participant name, participant service type, participant contact information, participant connection status, participant connection type, participant drop location, participant drop timestamp, and participant reconnect timestamp. In a specific embodiment of the invention, the participant data structure of FIG. 4 is comprised in the collaboration session data structure described above with respect to FIG. 3. Additionally or alternatively, the participant data structure may be separate from the aforementioned collaboration session data structure.

In embodiments, each participant (e.g., user) may have at least a portion of the data associated with the participant data structure stored in a profile at the client computing device (or at a central database). Additionally or alternatively, the server agent may prompt each participant to provide such information (e.g., via prompts and responses) during initial connection to the collaboration session. Moreover, the server agent may update the data contained in each participant data structure based upon events that occur during the collaboration session. In embodiments, the participant data structure for each participant is stored at the server and/or at the database.

In this manner, implementations of the invention are arranged to provide users who are disconnected from a collaboration session with enhanced capability to catch-up to the collaboration session. As such, the potentially adverse consequences of lost connection to a collaboration session are minimized.

Processes of the Invention

The steps of the flow diagrams described herein may be implemented in the environment of FIGS. 1 and/or 2. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
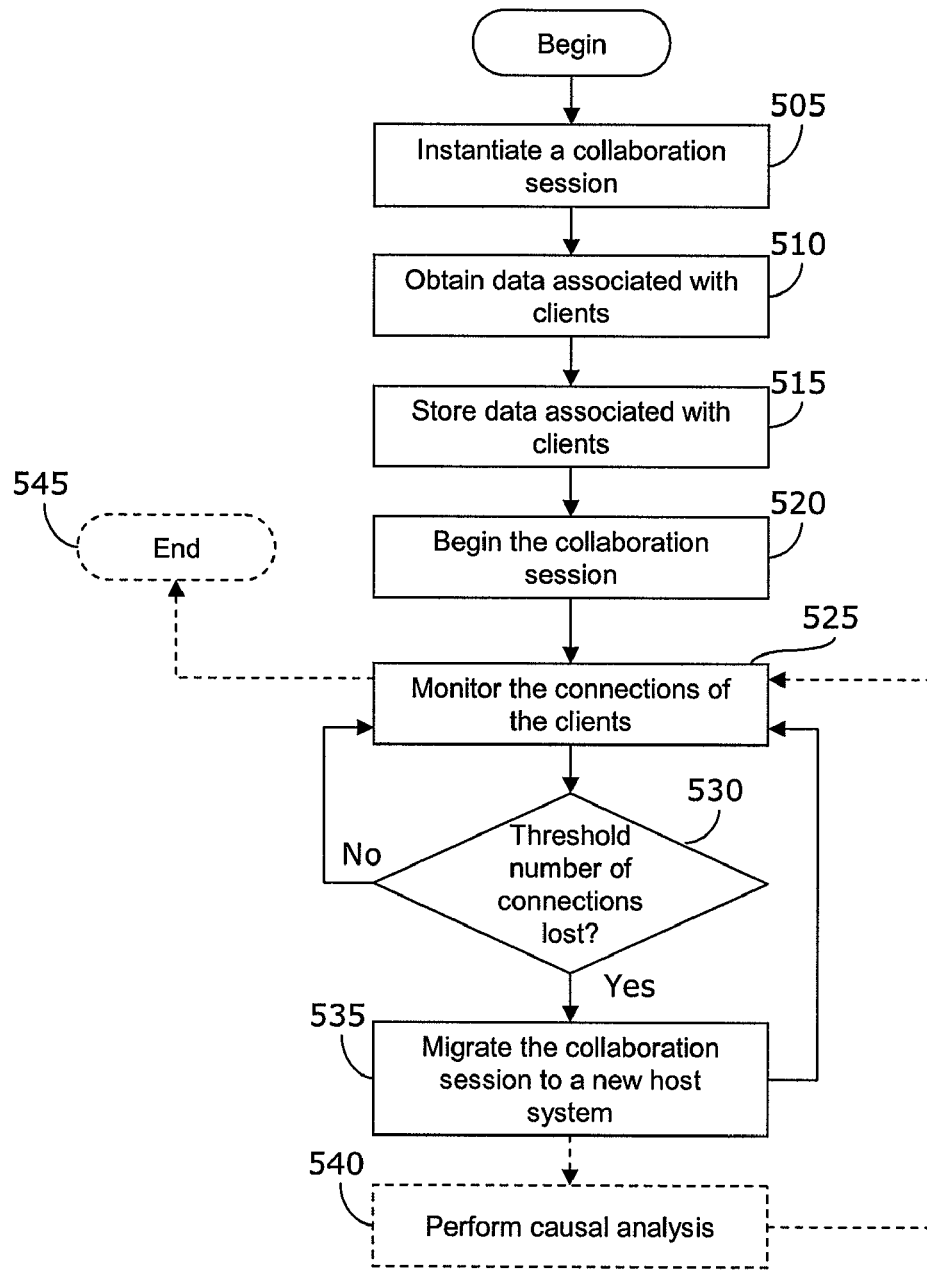
FIGS. 5-8 show flow diagrams depicting implementations of methods according to aspects of the invention.

FIG. 5 shows a flow diagram depicting steps of a first embodiment of the invention, in which an in-progress collaboration session is migrated to a new host system. At step 505, a collaboration session is instantiated. In embodiments, this is performed by a server agent that resides on a host system (e.g., server), as described above with respect to FIG. 2. For example, the server agent may notify all clients (e.g., via network communication) that a collaboration session has been created and is available for use, place any shared resources to be utilized during the collaboration session at a data location (e.g., server and/or database), and notify the clients where to go (e.g., URL, telephone number) to start the collaboration session.

At step 510, data regarding each client is obtained as clients connect to the collaboration session. In embodiments, this is performed by a server agent as described above with respect to FIG. 2. For example, the server agent may access a previously stored profile associated with each client to obtain data regarding, for example, client name, client primary collaboration type, client secondary collaboration type, client connection type, etc. If a profile does not exist for a client when the client joins a collaboration session, the server agent may prompt the client to create a profile or answer questions regarding such parameters.

At step 515, the data obtained in step 510, and any other suitable data regarding the collaboration session, is stored in a collaboration session data structure. In embodiments, this is performed as described above with respect to FIG. 2, using, for example, a collaboration session data structure similar to that shown in FIG. 3. For example, the server agent may store the collaboration session data structure at a server and/or database. Other data that may be stored in the collaboration session data structure includes a resource list of shared resources of the collaboration session.

At step 520, the collaboration session is begun. In embodiments, this includes plural clients collaborating through a host, as is known such that further explanation is not believed necessary.

At step 525, the in-progress collaboration session is monitored. In embodiments, this is performed as described above with respect to FIG. 2. For example, a server agent may monitor the connection of each client as the collaboration session is in progress to detect when a client's connection has aborted, is aborting, or is about to abort. More specifically, the server agent may communicate with the various client agents to monitor the connection status of each client.

At step 530, a determination is made as to whether a threshold number of clients are experiencing connection problems to the collaboration session. If not, then the process loops back to step 525, where the monitoring continues. If yes, then the process proceeds to step 535, where the collaboration session is migrated to a new host system.

In embodiments, migrating the collaboration session to a new host system in step 535 is accomplished in a manner similar to that described above with respect to FIG. 2. For example, a server agent determines a new host system (e.g., server, router(s), protocol, etc.), and transfers the shared resources to the new host system. Also, the server agent transfers (e.g., establishes a connection between) the non-dropped clients to the new host system. Furthermore, the server agent transfers the dropped clients to the new host system. The server agent performs the migration automatically using data contained in the collaboration session data structure to determine the shared resources, collaboration type, and connection type for each client. If any historic causal analysis data is available, the server agent may use this data to determine the new host system (e.g., the server agent may avoid using a server/router/protocol that is known to have caused problems in the past).

Optionally, at step 540, data regarding what caused the migration is stored. In embodiments, this is performed by the server agent as described above with respect to the causal analysis. For example, the server agent may store a record of what network issues caused clients to drop, thereby necessitating the migration in step 535.

From step 540 (or from step 535, if causal analysis data is not stored), the process loops back to step 525 where the in-progress collaboration session is monitored. Optionally, the collaboration session ends at step 545 in a known manner (e.g., the host terminates the session).

Figure 6:
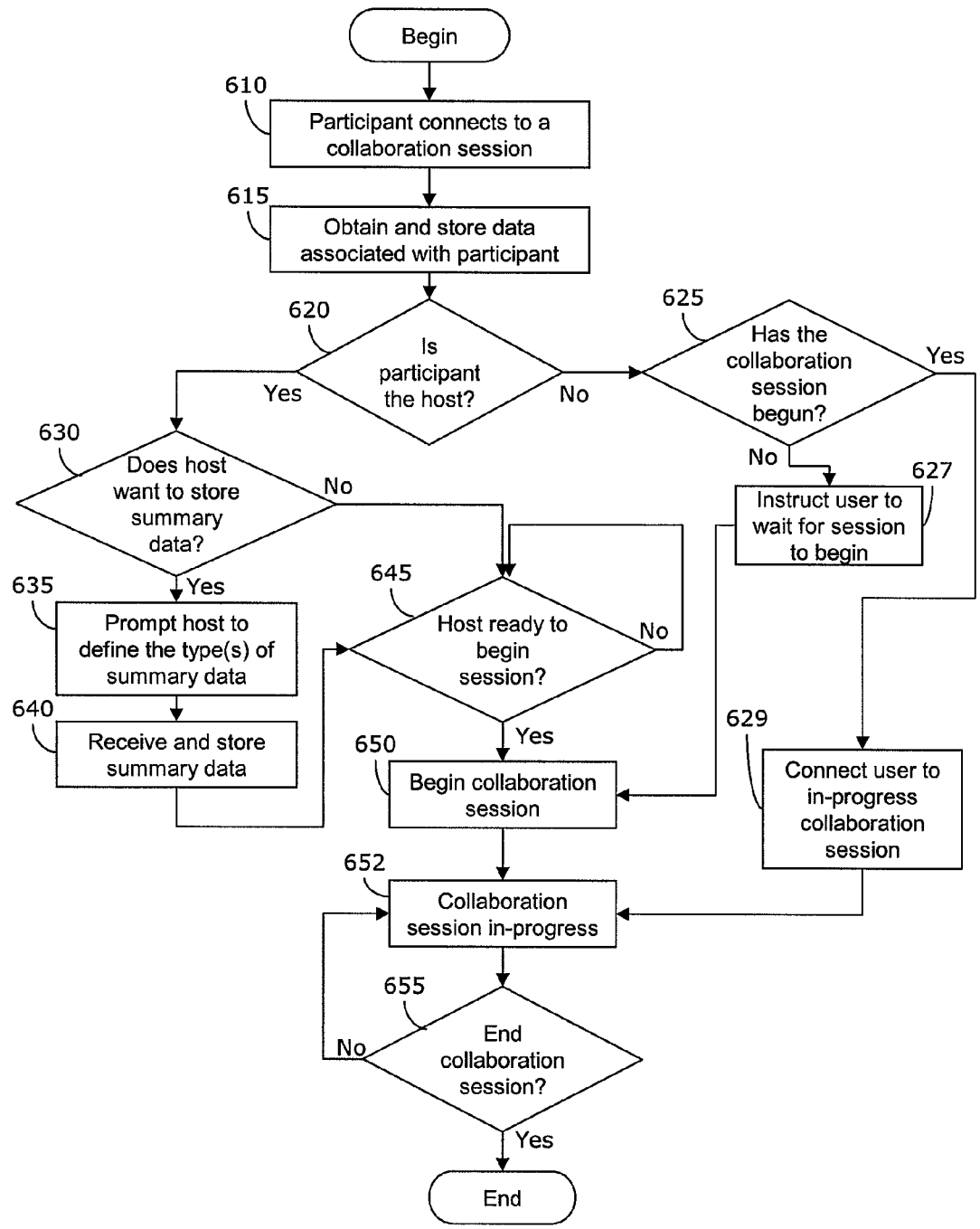

FIG. 6 shows a flow diagram depicting steps of another embodiment of the invention, in which the participants' initial connection to a collaboration session is managed. At step 610, a participant connects to collaboration session. In embodiments, this is performed in a known manner, such as, for example, dialing a specified telephone number, entering a passcode at a specific URL, etc. For example, a participant using a client computing device (e.g., client 210) may connect to a collaboration session hosted by a server computing device (e.g., server 230) via a network. The participant may be a client (e.g., user) or host (e.g., moderator) of the collaboration session.

At step 615, data is added to the participant data structure for the participant that connected to the collaboration session in step 610. In embodiments, a server agent obtains data regarding the participant from an already existing profile data file or by prompting the participant to enter data, as described above with respect to FIG. 4. The server agent also adds data to the participant data structure, such as: timestamp when the participant connected, type of collaboration, type of connection, etc. The server agent stores the participant data structure at a suitable location (e.g., a server or database).

At step 620, the server agent determines whether the participant that connected in step 610 is a user (e.g., client) or host (e.g., moderator) of the collaboration session. In embodiments, the server agent is able to distinguish between a user and a host using known techniques (e.g., by the passcode that is used to login to the collaboration session). If the participant is a user, then the process proceeds to step 625, where the server agent determines whether the collaboration session has started yet. If the collaboration session has not yet begun, then at step 627 the user is instructed to wait for the collaboration session to begin. For example, the server agent may play a pre-recorded message indicating that the user should wait for the collaboration session to begin. After step 627, the session is begun by the host at step 650, described in greater detail below.

If, at step 625, the server agent determines that the collaboration session has begun, then, at step 629, the user is connected to the in-progress collaboration session. In embodiments, this is performed by the server agent in a manner that is known, such that further explanation is not believed necessary.

If, at step 620, the server agent determines that the participant is the host of the collaboration session, then, at step 630, the server agent determines whether the host intends to store summary data for the collaboration session. In embodiments, the server agent presents the host with an option to store summary data. For example, when a host is connecting to the collaboration session, he/she is asked by the server agent if he/she would like to store summary data.

If the host decides not to store summary data, then the process proceeds to step 645, where the server agent determines whether the host is ready to begin the collaboration session. If the host is ready to begin, then at step 650 the collaboration session is begun. This may be accomplished by the server agent in manner that is known, such that further explanation is not believed necessary. However, if the host is not ready to begin the collaboration session at step 645, then the collaboration session is suspended until the host begins the collaboration session. For example, the host may decide to wait for a period of time (e.g., a few minutes) for other user(s) to login before beginning the collaboration session at step 650.

At step 630, if the host decides to store summary data, then at step 635 the host is prompted to define the type of summary data that will be used. As already described herein, the summary data may include at least one of: text, pictures, slideshows, voice messages, and video images. In embodiments, the server agent prompts the host to choose the type of summary data that will be stored. This may be performed by presenting a menu with options to the host via the host computing device.

At step 640, the summary data is input and stored. In embodiments, the server agent allows the host to enter (e.g., upload) the summary data via a host computing device. For example, the server agent may allow the host to specify that a particular summary data text message is associated with a particular portion of the collaboration session, and that a particular summary video clip is associated with another portion of the collaboration session. By associating the summary data with portions of the collaboration session, the server agent can later provide targeted summary data to a user that dropped from a certain portion of the collaboration session, as described in greater detail below.

In embodiments, if multiple collaboration types are allowed in the collaboration session, the host can provide unique summary data for each type of collaboration. For example, the server agent allows the host to store a voice message for users who are connecting using VOIP, while also allowing the host to store text messages for users who connect using online chat.

In further embodiments, the server agent additionally allows the host to specify summary data that is unique to certain users. For example, a user that logged in with a certain passcode may be designated to receive certain summary data that other users do not have the ability to access. In this manner, a first user (or group of users) can be presented with a first subset of summary data, while a second user (or group of users) is presented with a second subset of summary data that differs from the first.

In additional embodiments, if the collaboration type is chat, the server agent additionally allows the host to set keywords and set a span of how much summary data (e.g., before and after each detected keyword) should be stored as summary data. For example, the host may set a span of five comments or sentences before and after a detected keyword. In this way, when a re-connected user types the keyword, they will receive the five summary comments that precede and follow the keyword in the summary data.

In further embodiments, if the collaboration type is VOIP (or uses voice like with POTS or cell phone), the server agent additionally allows the host to set keywords and set a limit of how much time (before and after each detected keyword) should be stored as summary data. Known voice recognition technology can be used to detect these keywords, for example. In this way, when a re-connected user speaks a keyword, they will receive an amount of stored summary audio data that precedes and follows the keyword in the summary data.

In even further embodiments, if the collaboration type is a presentation (e.g., web conference), the server agent additionally allows the host to set certain chart numbers and speaker notes that should be stored as summary data, for example. In this way, a re-connected user will be provided with the charts/notes that are associated with the portions of the collaboration session that were missed due to the dropped connection.

At step 650, the collaboration session is begun. This is accomplished by the server agent in a known manner, such that further explanation is not believed necessary. In embodiments, at step 650, the server agent begins recording the collaboration session. In embodiments, the recording constitutes storing data (e.g., text, audio, video) of the happenings of the collaboration session, and a running timestamp associated with the data. In this manner, the server agent can define portions of the collaboration session, which portions can later be used with a user's disconnect and reconnect timestamps to determine which portions of the collaboration session a dropped user missed. The data and timestamps may be stored by the server agent at, for example, a server or database.

At step 652, the collaboration session proceeds in-progress in a normal manner. At step 655, the server agent determines whether the collaboration session comes to an end (e.g., concludes in a routine fashion). For example, when all participants decide that the collaboration session is over, or the host (e.g., moderator) decides that the collaboration session is over, then the server agent terminates the collaboration session in a known manner. For example, upon ending the collaboration session, the server agent disconnects all users and frees any shared resources in a known manner, such that further explanation is not believed necessary. However, if the collaboration session is not ended, then the process loops back to 652.

Figure 7:
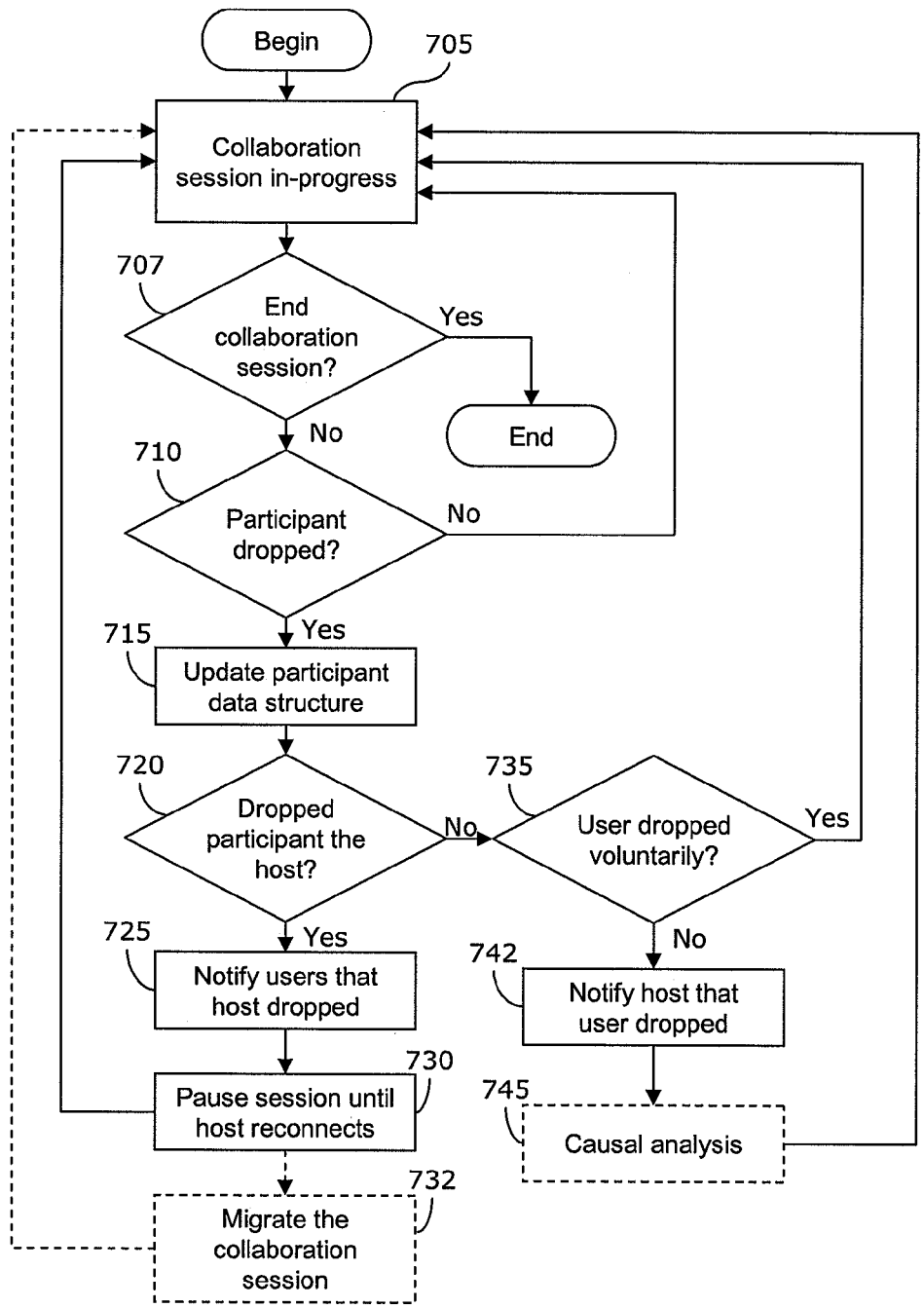

FIG. 7 shows a flow diagram depicting steps of another embodiment of the invention, which includes managing participants that are dropped from an in-progress collaboration session. Step 705 represents a collaboration session that is in-progress. For example, the collaboration session may have been instantiated in the manner described above with respect to FIG. 6, such that step 705 may be equivalent to step 652 described above. At step 707, the server agent determines whether the collaboration session is ended. For example, when all participants decide that the collaboration session is over, or the host (e.g., moderator) decides that the collaboration session is over, then the server agent terminates the collaboration session in a known manner. However, if the collaboration session is not ended, then the process proceeds to step 710.

At step 710, the server agent determines whether a participant has dropped from an in-progress collaboration session. In embodiments, this is performed by the server agent, which detects that a participant's connection to the collaboration session has aborted, is aborting, or is about to abort. Because the server agent is continuously monitoring all participants' connection status, the server agent is able to determine the identity of any participant that disconnects from the collaboration session. If no participant is detected as dropped, then the process loops back to step 705. However, if a participant is detected as being dropped, then the process proceeds to step 715.

At step 715, the participant data structure (such as, for example, that described above with respect to step 615) of the participant that dropped is updated to reflect the time that the participant dropped from the collaboration session. In embodiments, the server agent performs this update by accessing and modifying the stored participant data structure with a timestamp of when the participant dropped relative to an ongoing timestamp of the in-progress collaboration session.

At step 720, the server agent determines whether the dropped participant is the host (e.g., moderator) or a client (e.g., user) of the collaboration session. In embodiments, the server agent makes this determination based upon the known identity of the dropped participant (e.g., from step 620, described above). If the dropped participant is the host, then at step 725, the server agent notifies the users of the collaboration session that the host has become disconnected. At step 730, the collaboration session is paused until the host reconnects. In embodiments, the host reconnects in any suitable manner (e.g., manually logon to the collaboration session again). However, alternatively, the entire collaboration session may be migrated to a new host system at step 732, such as described above with respect to FIG. 5. Once the host is reconnected (or the migration is complete), the collaboration session resumes at block 705.

If the server agent determines at step 720 that the dropped participant is a user (i.e., not the host), then at step 735 the server agent determines whether the user dropped voluntarily. In embodiments, the server agent communicates with the respective client agent of each user to monitor the connection status of each user. From this communication, the server agent is able to determine whether a disconnection is voluntary (e.g., the user decided to logoff) or involuntary (e.g., the network connection between the host system and client was lost). If the user dropped from the collaboration session voluntarily, then the process continues at step 705.

In embodiments, if the user was dropped from the collaboration session involuntarily, then at step 742, the server agent informs the host that this user was dropped involuntarily. This allows the host to pause the collaboration session, if desired, to wait for the user to reconnect.

Optionally, at step 745, data regarding what caused the involuntary drop is obtained and stored. In embodiments, this is performed by the server agent in a manner similar to the causal analysis described above at step 540. For example, the server agent may store a record of what network issues caused the user to be involuntarily disconnected.

Figure 8:
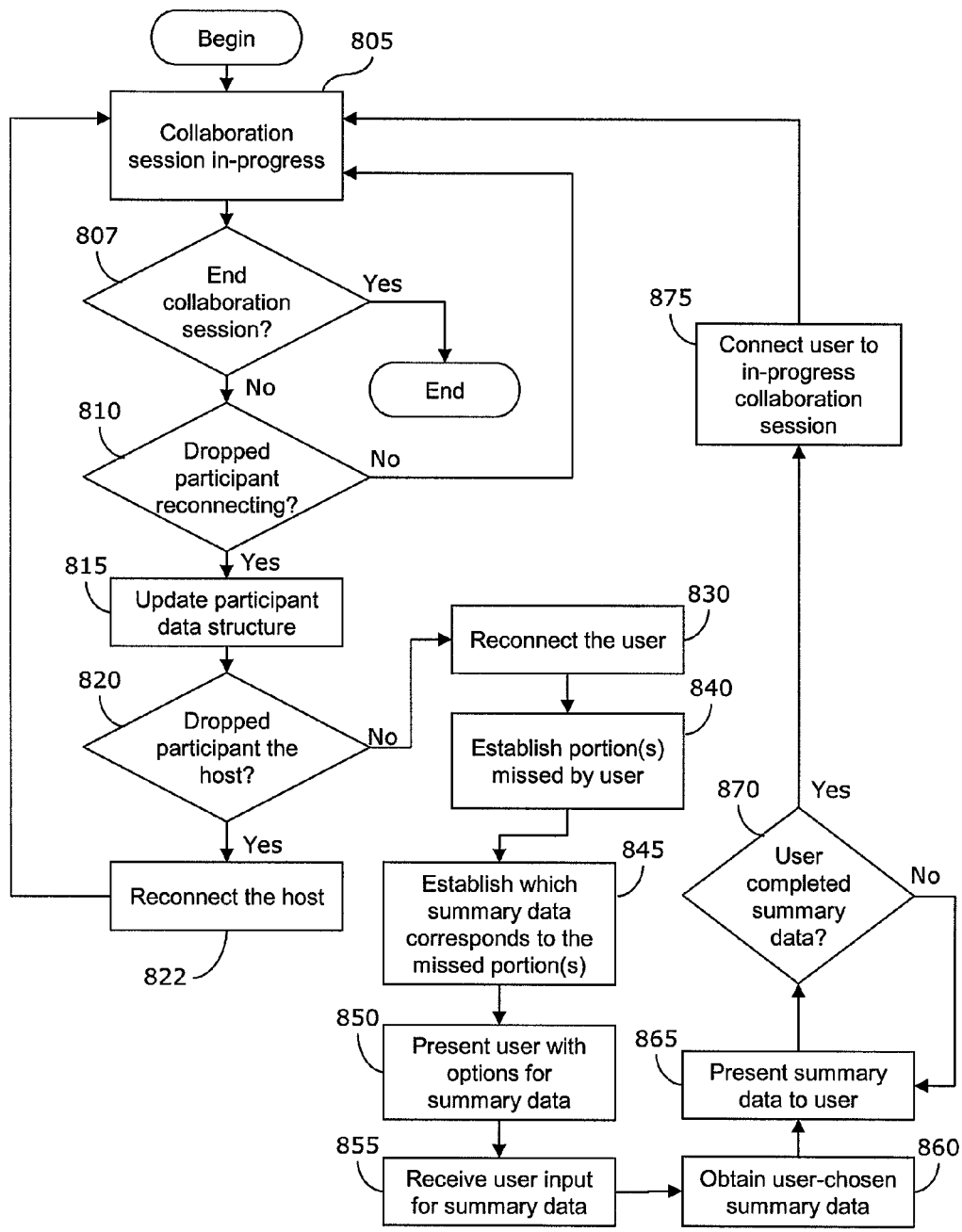

FIG. 8 shows a flow diagram depicting steps of another embodiment of the invention, in which a dropped participant reconnects to an in-progress collaboration session. Step 805 represents a collaboration session that is in-progress. For example, the collaboration session may have been instantiated in the manner described above with respect to FIG. 6, such that step 805 may be equivalent to step 652. At step 807, the server agent determines whether the collaboration session is ended. Step 807 may be performed similar to step 707 described above (e.g., in any suitable manner).

At step 810, the server agent determines whether a dropped participant is reconnecting to the in-progress collaboration session. In embodiments, this is performed by the server agent. For example, the server agent is arranged to detect when a participant is reconnecting to the collaboration session. If no participant is reconnecting, then the process loops back to step 805. However, if it is detected that a participant is reconnecting to the collaboration session, then the method proceeds to step 815.

At step 815, the reconnecting participant's data structure is updated to reflect the reconnection. In embodiments, the server agent accesses the reconnecting participant's data structure (e.g., that described with respect to steps 615 and/or 715) and modifies data regarding a timestamp of when the participant reconnected relative to the ongoing timestamp of the in-progress collaboration session.

At step 820, the server agent determines whether the reconnecting participant is a user or the host of the collaboration session. In embodiments, the server agent determines this from the identity of the participant (e.g., similar to step 620). If the reconnecting participant is the host, then at step 822 the server agent reconnects the host, and the method returns to step 805 where the collaboration session continues in a normal fashion.

If the reconnecting participant is a user, then at step 830 the user is reconnected to the collaboration session. In embodiments, this is performed by the server agent in a known manner. At step 840, the server agent determines what portions of the collaboration session were missed by the reconnected user. The server agent determines this by accessing the data stored in the participant data structure of the reconnecting participant, and comparing the disconnect timestamp and reconnect timestamp to the ongoing timestamp of the collaboration session.

At step 845, the server agent determines which, if any, summary data is associated with the missed portions of the collaboration session. In embodiments, this is performed by the server agent comparing the missed portions of the collaboration session (e.g., determined in step 840) to the stored summary data (e.g., stored and defined in steps 635 and 640).

At step 850, the user is presented with options for accessing the available summary data determined in step 845. In embodiments, the server agent presents any available options for summary data associated with the missed portions of the collaboration session to the user. For example, the server agent may present the reconnecting user with a pop-up window that allows the user to choose any of the following (if available based upon step 845): reconnect to a recorded version of the collaboration session and always remain time-shifted behind the actual current collaboration session state (using, for example, DVR-type technology); skip any available summary information and join the collaboration session at the current state; manually catch themselves up in a separate session (e.g., navigate through any missed slides/text/audio/video) and join current collaboration session state when done; view summary text and join current event state when done (e.g., if chat used); view summary slides and listen to associated voice and join current event state when done (e.g., if presentation like web conference is used); and, listen to summary voice data and join current event state when done (e.g., if VOIP, POTS, or cell used).

At step 855, the reconnected user is permitted to choose which summary data to be presented with. In embodiments, the server agent receives the user's menu selections from the reconnected user's computing device. At step 860, the server agent obtains the user-selected summary data. For example, the server agent may access the requested summary data from wherever the summary data is stored (e.g., from step 640).

At step 865, the summary data is presented to the reconnecting user. For example, the server agent may create a private session that only the reconnecting user can view/hear. Alternatively, the server agent may display the summary data to the reconnecting user in a picture-in-picture style window, while displaying the in-progress collaboration session in a main window.

At step 870, it is determined whether the reconnecting user has completed reviewing the summary data. In embodiments, the server agent monitors the reconnecting user's progress of reviewing the summary data. If the reconnecting user reaches the end of the available summary data, then the server agent reconnects the user to the in-progress collaboration session at step 875. If the reconnecting user has not reached the end of the summary data, then the process loops back to step 865.

In embodiments, the server agent may be arranged to simultaneously monitor and manage collaboration session migration strategy (e.g., FIG. 5), monitor and manage participants' initial connection (e.g., FIG. 6), monitoring and management of dropped participants (e.g., FIG. 7), and monitoring and management of reconnecting participants (e.g., FIG.

8). For example, a master server agent may spawn individual server agents that are arranged to perform any of the above-described functions.

While the invention has been described in terms of embodiments, those skilled in the art will recognize that the invention can be practiced with modifications and in the spirit and scope of the appended claims.

What is claimed:

1. A method for migrating a collaboration session, comprising:
    starting the collaboration session at a first host system between a plurality of clients;
    obtaining profile information including each client's connection type;
    storing the profile information in a collaboration session data structure at the first host system, the collaboration session data structure further including any shared resources that are part of the collaboration session;
    monitoring a connection of each of the plurality of clients to the collaboration session at the first host system for evidence of link unreliability as evidenced by an aborted or about to abort connection;
    determining when more than one of the plurality of clients connected via an unreliable link with the first host system exceeds a threshold value, wherein the unreliable link is evidenced by an aborted or about to abort connection;
    migrating clients connected to the first host system via a reliable link and the more than one of the plurality of clients connected to the first host system via the unreliable link to a second host system, wherein the migrating of the clients and the more than one of the plurality of clients is performed when the more than one of the plurality of clients connected via the unreliable link exceeds the threshold value;
    reconnecting each client connection that aborted using the profile information;
    conducting an analysis after the migration of the collaboration session in order to determine an issue that caused the threshold number of clients' connections to be aborted; and
    saving the causal issue and utilize the causal issue in future migrations to select an appropriate second host by avoiding previous causal issues,
    wherein:
    the migration occurs by utilizing the collaboration session data structure; and
    the profile information includes primary and secondary connection types for each client, and when reconnection of an aborted client is not possible with the primary connection type, then the secondary connection type is utilized to reconnect the aborted client.

2. The method of claim 1, wherein the migrating comprises:
    disconnecting the clients with the reliable link and the more than one of the plurality of clients with the unreliable link from the first host system;
    connecting the clients with the reliable link and the more than one of the plurality of clients with the unreliable link to the second host system; and
    transferring shared resources of the collaboration session from the first host system to the second host system.

3. The method of claim 1, wherein at least one of the storing, the monitoring, the determining, and the migrating are provided by a service provider under a subscription and/or fee agreement and/or based on advertising content to one or more third parties.

4. The method of claim 1, wherein a service provider at least one of creates, maintains, deploys and supports a computer infrastructure that performs at least one of the storing, the monitoring, the determining, and the migrating.

5. The method of claim 1, wherein the migrating causes instantiation of a new topological link path, different from the initial reliable link and the initial unreliable link, between the migrated clients and the second host system such that the initial reliable link and the initial unreliable link are no longer utilized for the collaboration session.

6. A method for managing reconnection of users to a collaboration session, comprising:
    starting the collaboration session at a first host system between a plurality of clients;
obtaining profile information including each client's connection type;
    storing the profile information in a collaboration session data structure at the first host system, the collaboration session data structure further including any shared resources that are part of the collaboration session;
    monitoring a connection of each of the plurality of clients to the collaboration session at the first host system for evidence of link unreliability as evidenced by an aborted or about to abort connection;
    determining when more than one of the plurality of clients connected via an unreliable link with the first host system exceeds a threshold value, wherein the unreliable link is evidenced by an aborted or about to abort connection;
    migrating clients connected to the first host system via a reliable link and the more than one of the plurality of clients connected to the first host system via the unreliable link to a second host system, wherein the migrating of the clients and the more than one of the plurality of clients is performed when the more than one of the plurality of clients connected via the unreliable link exceeds the threshold value;
    reconnecting each client connection that aborted using the profile information;
    conducting an analysis after the migration of the collaboration session in order to determine an issue that caused the threshold number of clients' connections to be aborted;
    saving the causal issue and utilize the causal issue in future migrations to select an appropriate second host by avoiding previous causal issues;
    determining a time period between at least one of the plurality of clients aborting from and reconnecting to the collaboration session; and
    presenting customized summary data of the collaboration associated with the time period to the at least one of the plurality of clients, after the at least one of the plurality of clients reconnects to the collaboration session,
    wherein:
    the migration occurs by utilizing the collaboration session data structure; and
    the profile information includes primary and secondary connection types for each client, and when reconnection of an aborted client is not possible with the primary connection type, then the secondary connection type is utilized to reconnect the aborted client.

7. The method of claim 6, further comprising:
    receiving summary data from a host of the collaboration session;
    associating the received summary data with at least one portion of the collaboration session; and determining the customized summary data from the received summary data.

8. The method of claim 6, wherein the presenting customized summary data comprises:
presenting first customized summary data to a first one of the at least one of the plurality of clients; and
presenting second customized summary data to a second one of the at least one of the plurality of clients,
wherein the first customized summary data differs from the second customized summary data.

9. The method of claim 6, further comprising prompting the at least one of the plurality of clients to choose the customized summary data from available customized summary data.

10. The method of claim 6, wherein the time period is determined based upon the stored profile information.

11. The method of claim 6, wherein at least one software agent performs the storing, the monitoring, the determining, and the presenting.

12. The method of claim 6, wherein at least one of the storing, the monitoring, the determining, and the presenting are provided by a service provider under a subscription and/or fee agreement and/or based on advertising content to one or more third parties.

13. The method of claim 6, wherein a service provider at least one of creates, maintains, deploys and supports a computer infrastructure that performs at least one of the storing, the monitoring, the determining, and the presenting.

14. A method for managing a collaboration session, comprising:
providing a computer infrastructure structured and arranged to:
start the collaboration session at a first host system between a plurality of clients;
obtain profile information including each client's connection type
store the profile information in a collaboration session data structure at the first host system, the collaboration session data structure further including any shared resources that are part of the collaboration session;
monitor a connection of each of the plurality of clients to the collaboration session at the first host system for evidence of link unreliability as evidenced by an aborted or about to abort connection;
determine when more than one of the plurality of clients connected via an unreliable link with the first host system exceeds a threshold value, wherein the unreliable link is evidenced by an aborted or about to abort connection;
migrate clients connected to the first host system via a reliable link and the more than one of the plurality of clients connected to the first host system via the unreliable link to a second host system, wherein the migrating of the clients and the more than one of the plurality of clients is performed when the more than one of the plurality of clients connected via the unreliable link exceeds the threshold value;
reconnect each client connection that aborted using the profile information;
conduct an analysis after the migration of the collaboration session in order to determine an issue that caused the threshold number of clients' connections to be aborted;
save the causal issue and utilize the causal issue in future migrations to select an appropriate second host by avoiding previous causal issues; and
present customized summary data to at least one of the plurality of clients after the at least one of the plurality of clients reconnects to the collaboration session after having been aborted from the collaboration session,
wherein:
the migration occurs by utilizing the collaboration session data structure; and
the profile information includes primary and secondary connection types for each client, and when reconnection of an aborted client is not possible with the primary connection type, then the secondary connection type is utilized to reconnect the aborted client.

15. The method of claim 14, wherein the computer infrastructure is further structured and arranged to:
receive summary data from a host of the collaboration session;
associate the received summary data with at least one portion of the collaboration session; and
determine the customized summary data from the received summary data.

16. The method of claim 14, wherein the migrating the clients with the reliable link and the more than one of the plurality of clients with the unreliable link to the second host system comprises:
connecting the clients with the reliable link and the more than one of the plurality of clients with the unreliable link to the second host system based upon the stored profile information; and
transferring shared resources of the collaboration session to the second host system.

17. A computer program product comprising a computer readable storage medium device having a computer readable program embodied in the storage medium, the computer program product includes at least one component operable to:
start a collaboration session at a first host system between a plurality of clients;
obtain profile information including each client's connection type;
store the profile information in a collaboration session data structure at the first host system, the collaboration session data structure further including any shared resources that are part of the collaboration session;
monitor a connection of each of the plurality of clients to the collaboration session at the first host system for evidence of link unreliability as evidenced by an aborted or about to abort connection;
determine when more than one of the plurality of clients connected via an unreliable link with the first host system exceeds a threshold value, wherein the unreliable link is evidenced by an aborted or about to abort connection;
migrate clients connected to the first host system via a reliable link and the more than one of the plurality of clients connected to the first host system via the unreliable link to a second host system, wherein the migrating of the clients and the more than one of the plurality of clients is performed when the more than one of the plurality of clients connected via the unreliable link exceeds the threshold value;
reconnect each client connection that aborted using the profile information;
conduct an analysis after the migration of the collaboration session in order to determine an issue that caused the threshold number of clients' connections to be aborted;
save the causal issue and utilize the causal issue in future migrations to select an appropriate second host by avoiding previous causal issues; and
present customized summary data to at least one of the plurality of clients after the at least one of the plurality of clients reconnects to the collaboration session after having been aborted from the collaboration session,
wherein:
the migration occurs by utilizing the collaboration session data structure; and
the profile information includes primary and secondary connection types for each client, and when reconnection of an aborted client is not possible with the primary connection type, then the secondary connection type is utilized to reconnect the aborted client.

18. The computer program product of claim 17, wherein the at least one component is further operable to cause the computing device to:
receive summary data from a host of the collaboration session;
associate the received summary data with at least one portion of the collaboration session; and
determine the customized summary data from the received summary data.

19. The computer program product of claim 17, wherein the migrating the clients with the reliable link and the more than one of the plurality of clients with the unreliable link to the second host system comprises:
connecting the clients with the reliable link and the more than one of the plurality of clients with the unreliable link to the second host system based upon the stored profile information; and
transferring shared resources of the collaboration session to the second host system.

20. A computer system for migrating a collaboration session, the system comprising:
a CPU, a computer readable memory and a computer readable storage device;
first program instructions to start the collaboration session at a first host system between a plurality of clients;
second program instructions to obtain profile information including each client's connection type;
third program instructions to store the profile information in a collaboration session data structure at the first host system, the collaboration session data structure further including any shared resources that are part of the collaboration session;
fourth program instructions to monitor a connection of each client to the collaboration session at the first host system for evidence of link unreliability as evidenced by an aborted or about to abort connection;
fifth program instructions to determine when more than one of the plurality of clients connected via an unreliable link with the first host system exceeds a threshold value, wherein the unreliable link is evidenced by an aborted or about to abort connection;
sixth program instructions to migrate the clients connected to the first host system via a reliable link and the more than one of the plurality of clients connected to the first host system via the unreliable link to a second host, wherein the migrating of the clients and the more than one of the plurality of clients is performed when the more than one of the plurality of clients connected via the unreliable link exceeds the threshold value;
seventh program instructions to reconnect each client connection that aborted using the profile information;
eighth program instructions to conduct an analysis after the migration of the collaboration session in order to determine an issue that caused the threshold number of clients' connections to be aborted; and
ninth program instructions to save the causal issue and utilize the causal issue in future migrations to select an appropriate second host by avoiding previous causal issues,
wherein:
the migration occurs by utilizing the collaboration session data structure,
the profile information includes primary and secondary connection types for each client, and when reconnection of an aborted client is not possible with the primary connection type, then the secondary connection type is utilized to reconnect the aborted client, and
the first through ninth program instructions are stored on the computer readable storage device for execution by the CPU via the computer readable memory.

21. The computer system of claim 20, the system further comprising:
tenth program instructions to provide summary data before the collaboration session begins, the summary data being associated with respective portions of the collaboration session;
eleventh program instructions to record a time when each client connection is aborted and when each client connection is reconnected;
twelfth program instructions to determine based on the recorded times a portion of the collaboration session missed for each client aborted; and
thirteenth program instructions to present summary data to each client aborted, the summary data being associated with a respective portion of the collaboration session that each client missed during a timeframe in which they were aborted.

22. The computer system of claim 21, the system further comprising:
fourteenth program instructions to determine whether each client connection that is aborted occurred voluntarily or involuntarily; and
fifthteenth program instructions to inform a host of the collaborative session when a clients' connection is aborted and whether the abort was voluntary or involuntary.

23. The computer system of claim 22, wherein:
the migrating comprises:
disconnecting the clients with the reliable link and the more than one of the plurality of clients with the unreliable link from the first host system;
connecting the clients with the reliable link and the more than one of the plurality of clients with the unreliable link to the second host system;
the reconnecting each client connection that aborted; and
transferring the shared resources of the collaboration session from the first host system to the second host system,
the migrating causes instantiation of a new topological link path, different from the initial reliable link and the initial unreliable link, between the migrated clients and the second host system such that the initial reliable link and the initial unreliable link are no longer utilized for the collaboration session.

* * * * *